United States Patent
De Keyzer et al.

(10) Patent No.: US 11,351,718 B2
(45) Date of Patent: Jun. 7, 2022

(54) OVERMOULDING BY 3D PRINTING

(71) Applicant: Plastic Omnium Advanced Innovation and Research, Brussels (BE)

(72) Inventors: Pierre De Keyzer, Brussels (BE); Eric Deparis, Levallois-Perret (FR)

(73) Assignee: Plastic Omnium Advanced Innovation and Research, Brussels (BE)

( * ) Notice: Subject to any disclaimer, the term of this patent is extended or adjusted under 35 U.S.C. 154(b) by 592 days.

(21) Appl. No.: 16/326,090

(22) PCT Filed: Aug. 18, 2017

(86) PCT No.: PCT/EP2017/070954
§ 371 (c)(1),
(2) Date: Feb. 15, 2019

(87) PCT Pub. No.: WO2018/033632
PCT Pub. Date: Feb. 22, 2018

(65) Prior Publication Data
US 2019/0283314 A1 Sep. 19, 2019

(30) Foreign Application Priority Data

Aug. 19, 2016 (EP) .................................. 161849674
May 24, 2017 (EP) .................................. 173056128

(51) Int. Cl.
*B29C 64/118* (2017.01)
*B33Y 10/00* (2015.01)
(Continued)

(52) U.S. Cl.
CPC ........ *B29C 64/118* (2017.08); *B29C 45/0053* (2013.01); *B29C 64/106* (2017.08);
(Continued)

(58) Field of Classification Search
CPC . B29C 64/118; B29C 45/0053; B29C 64/106; B29C 70/74; B60K 15/03;
(Continued)

(56) References Cited

U.S. PATENT DOCUMENTS 3,663,031 A * 5/1972 Young .................... A63C 17/08
280/11.24
2003/0070387 A1 4/2003 Klocke et al.
(Continued)

FOREIGN PATENT DOCUMENTS

CN 1412466 A 4/2003
CN 1956846 A 5/2007
(Continued)

OTHER PUBLICATIONS

International Search Report dated Nov. 6, 2017 in PCT/EP2017/070954 filed on Aug. 18, 2017.

*Primary Examiner* — Audrey B. Walter
(74) *Attorney, Agent, or Firm* — Oblon, McClelland, Maier & Neustadt, L.L.P.

(57) ABSTRACT

A method for manufacturing a thermoplastic component for fuel systems or SCR systems includes the following steps: (1) molding and/or forming of a thermoplastic substrate from a first thermoplastic material, and (2) three-dimensional printing of a second thermoplastic material onto a first area of the thermoplastic substrate obtained after step (1). The first thermoplastic material of the thermoplastic substrate and the second thermoplastic material have a chemical compatibility.

20 Claims, 1 Drawing Sheet

| absorbing \ transmissive | ABS | ASA | COC | MABS | PA 12 | PA 612 | PA 6 | PA 66 | PBT | PC | PC/ABS* | PE-HD | PE-LD | PEEK | PES | PMMA | POM | PP | PPS | PS | PSU | PTFE | SAN | TPE |
|---|---|---|---|---|---|---|---|---|---|---|---|---|---|---|---|---|---|---|---|---|---|---|---|---|
| ABS | ++ | ++ | x | ++ | | | x | x | ++ | ++ | | x | x | | + | ++ | + | x | | x | + | | ++ | ++ |
| ASA | ++ | ++ | | x | | | x | x | ++ | + | | | | | | ++ | x | x | | | | | ++ | |
| COC | x | | + | | | | | | x | | | | | | | + | | | x | | | | x | |
| MABS | ++ | x | | ++ | | | x | x | x | | | | | | x | | x | x | | | x | | x | |
| PA 12 | | | | | ++ | ++ | - | x | - | | | x | x | | - | x | x | x | | | | | | |
| PA 612 | | | | | ++ | ++ | + | x | x | | | | | | | x | | | | | | | | |
| PA 6 | | | | | - | - | ++ | ++ | x | | | - | - | | x | x | x | - | | + | | | | |
| PA 66 | | | | | x | - | ++ | ++ | x | - | | - | x | | x | x | x | - | x | + | | | | + |
| PBT | ++ | ++ | | x | x | + | - | x | ++ | ++ | | x | x | | + | x | x | x | | x | + | | ++ | |
| PC | ++ | | x | | | | | | - | ++ | ++ | x | x | | | ++ | | x | | - | - | | ++ | + |
| PC/ABS* | ++ | ++ | | | | | | | ++ | ++ | | | | | | ++ | | | | | | | | |
| PE-HD | x | | | | x | | - | - | x | x | | ++ | ++ | | - | - | x | | x | | | | x | |
| PE-LD | x | | | | x | | - | - | x | x | | ++ | ++ | | - | - | ++ | | x | | | | x | |
| PEEK | | | | | | | | | | | | | | ++ | | | | | | | | | | |
| PES | + | x | | x | | | x | x | x | + | | | | | ++ | | - | x | | x | ++ | | x | |
| PMMA | ++ | | | | + | x | x | x | x | - | x | ++ | - | | x | ++ | + | - | | + | | | ++ | |
| POM | - | x | | x | x | x | x | x | x | - | | - | + | ++ | x | + | ++ | x | x | x | x | | x | |
| PP | x | x | | x | x | x | - | - | x | x | | ++ | x | | - | - | ++ | x | | x | | | x | ++ |
| PPS | | | | | x | x | - | - | | ++ | | | | | - | x | - | x | ++ | | | | - | |
| PS | x | x | x | x | | | + | + | x | - | | | | | - | + | x | x | | ++ | + | | - | |
| PSU | + | x | | x | | | x | x | + | | | | | | ++ | | x | x | | + | ++ | | x | |
| PTFE | | | | | | | | | | | | | | | | | | | | | | ++ | | |
| SAN | ++ | ++ | x | x | | | x | x | - | + | | x | x | | ++ | x | x | | - | | | | ++ | |
| TPE | | | | | | | | | + | + | | | | | | | ++ | x | | | | | | ++ |

++ Excellent weld   + Good weld   - Poor weld   x No weld   ☐ No research available

(51) Int. Cl.
  *B33Y 70/00* (2020.01)
  *B33Y 80/00* (2015.01)
  *B29C 70/74* (2006.01)
  *F01N 3/20* (2006.01)
  *F01N 13/16* (2010.01)
  *B29C 45/00* (2006.01)
  *B29C 64/106* (2017.01)
  *B60K 15/03* (2006.01)
  *B29K 101/12* (2006.01)
  *B29K 59/00* (2006.01)
  *B29K 105/12* (2006.01)

(52) U.S. Cl.
  CPC .............. *B29C 70/74* (2013.01); *B33Y 10/00* (2014.12); *B33Y 70/00* (2014.12); *B33Y 80/00* (2014.12); *B60K 15/03* (2013.01); *F01N 3/2066* (2013.01); *F01N 13/16* (2013.01); *B29K 2059/00* (2013.01); *B29K 2101/12* (2013.01); *B29K 2105/12* (2013.01); *B60K 2015/03032* (2013.01); *F01N 2530/18* (2013.01); *F01N 2610/01* (2013.01); *F01N 2610/02* (2013.01); *F01N 2610/1406* (2013.01)

(58) Field of Classification Search
  CPC .......... B60K 2015/03032; B33Y 10/00; B33Y 70/00; B33Y 80/00; F01N 3/2066; F01N 13/16; F01N 2610/02; F01N 2530/18; F01N 2610/01; F01N 2610/1406; B29K 2059/00; B29K 2105/12; B29K 2101/12
  See application file for complete search history.

(56) References Cited

U.S. PATENT DOCUMENTS

| | | | |
|---|---|---|---|
| 2003/0124281 A1 | 7/2003 | Ries et al. | |
| 2005/0266232 A1 | 12/2005 | Wang et al. | |
| 2011/0183088 A1 | 7/2011 | Shimizu et al. | |
| 2014/0205814 A1* | 7/2014 | Hwang | B44C 1/1712 |
| | | | 428/195.1 |
| 2014/0268604 A1 | 9/2014 | Wicker et al. | |
| 2015/0151630 A1* | 6/2015 | Bethea | B32B 5/022 |
| | | | 220/562 |
| 2016/0243930 A1 | 8/2016 | Criel et al. | |
| 2018/0036916 A1* | 2/2018 | Pettey | B29C 33/3842 |
| 2019/0291402 A1* | 9/2019 | Amba | B32B 17/10 |

FOREIGN PATENT DOCUMENTS

| | | | |
|---|---|---|---|
| CN | 102189863 A | | 9/2011 |
| CN | 105453709 A | | 3/2016 |
| CN | 105658462 A | | 6/2016 |
| CN | 205467412 U | | 8/2016 |
| DE | 10 2014 107 098 A1 | | 11/2015 |
| EP | 2 801 512 A1 | | 11/2014 |
| KR | 20160082436 A | * | 7/2016 |
| WO | WO 2015/059249 A1 | | 4/2015 |

* cited by examiner

| transmissive \ absorbing | ABS | ASA | COC | MABS | PA 12 | PA 612 | PA 6 | PA 66 | PBT | PC | PC/ABS* | PE-HD | PE-LD | PEEK | PES | PMMA | POM | PP | PPS | PS | PSU | PTFE | SAN | TPE |
|---|---|---|---|---|---|---|---|---|---|---|---|---|---|---|---|---|---|---|---|---|---|---|---|---|
| TPE | ‡ | | | | | | + | | + | | | | | | | | ‡ | | | | | | | ‡ |
| SAN | ‡ | ‡ | × | × | | | | | ‡ | ‡ | | × | × | | × | ‡ | × | × | - | - | × | | ‡ | |
| PTFE | | | | | | | | | | | | | | | | | | | | | | ‡ | | |
| PSU | + | | | × | | | | | + | | | | | | ‡ | | × | × | | × | ‡ | | | |
| PS | × | | × | | | | + | + | × | - | | × | × | | × | + | × | | | ‡ | | | - | × |
| PPS | | | | | | | | | × | | | | | | | | | | × | ‡ | | | | |
| PP | × | × | | × | × | | - | - | × | × | | × | ‡ | | × | - | × | ‡ | × | × | × | | × | ‡ |
| POM | + | × | | × | × | | × | × | × | | | - | - | | - | + | ‡ | - | - | × | × | | × | |
| PMMA | ‡ | ‡ | + | | × | × | × | × | × | ‡ | ‡ | - | - | | ‡ | + | - | | × | + | | | ‡ | |
| PES | + | | | × | - | | × | × | + | | | | | | ‡ | × | - | × | - | - | ‡ | | | |
| PEEK | | | | | | | | | | | | | | ‡ | | | | | | | | | | |
| PE-LD | × | | | × | | - | × | × | | | | ‡ | ‡ | | | - | - | ‡ | | | | | × | |
| PE-HD | × | | | × | | - | - | × | × | | | ‡ | ‡ | | | - | - | | | | | | × | |
| PC/ABS* | | | | | | | | | | ‡ | | | | | | ‡ | | | | | | | | |
| PC | ‡ | + | × | | | | | - | ‡ | ‡ | ‡ | × | × | | | × | | | × | ‡ | - | | + | + |
| PBT | ‡ | ‡ | | × | - | × | × | × | ‡ | ‡ | | × | × | | + | - | × | × | | × | + | | | - |
| PA 66 | × | × | | × | × | × | ‡ | ‡ | × | - | | - | - | | × | × | - | - | + | × | | | × | + |
| PA 6 | × | × | | × | - | + | ‡ | ‡ | - | | | - | - | | × | × | - | - | + | × | | | × | |
| PA 612 | | | | | ‡ | ‡ | - | - | + | | | | | | × | × | × | × | × | | | | | |
| PA 12 | | | | | ‡ | ‡ | - | × | × | | | × | × | | × | × | × | × | × | | | | | |
| MABS | ‡ | × | | ‡ | | | | × | | | | | | | × | + | × | × | | × | × | | × | |
| COC | × | | + | | | | | × | | | | | | | | | | × | | × | | | | |
| ASA | ‡ | ‡ | × | | | | ‡ | ‡ | | | | | | | × | | × | × | | × | × | | ‡ | |
| ABS | ‡ | ‡ | × | ‡ | | | ‡ | ‡ | ‡ | × | × | | | | + | ‡ | - | × | | × | + | | ‡ | |

Legend: ++ Excellent weld, + Good weld, - Poor weld, × No weld, (blank) No research available even the manufacturing of thermoplastic components for the automotive industry.

OVERMOULDING BY 3D PRINTING

CROSS-REFERENCE TO RELATED APPLICATIONS

This application is a United States national stage application of International Application No. PCT/EP2017/070954, filed Aug. 8, 2018, which designates the United States, and claims priority to European Patent Application No. 16184967.4, filed Aug. 19, 2016 and European Patent Application No. 17305612.8, filed May 24, 2017, and the entire contents of each of the above applications are hereby incorporated herein by reference in entirety.

FIELD OF THE INVENTION

The present invention relates to thermoplastic components dedicated to vehicle fuel systems and selective catalytic reduction (SCR) systems. In particular, the invention relates to a manufacturing method providing complex shapes out of thermoplastic materials to form thermoplastic components dedicated to vehicle fuel systems and SCR systems.

BACKGROUND

Most of the vehicles nowadays comprise thermoplastic components in their fuel systems and their SCR systems, said SCR systems allowing the purification of exhaust gas with a reducing agent.

Generally, fuel and SCR systems comprise thermoplastic components such as valves, baffles or sensors. Particularly, a fuel system or a SCR system may comprise thermoplastic components having complex geometry e.g. a roll-over valve, a venting valve, a bracket, a filter, a nipple, a heating support, an electrical connector or any other component being stored within a system or a SCR system or attached on its outer surface.

Generally, the thermoplastic component is incorporated in a tank of a fuel system or a SCR system. Therefore, said thermoplastic component requires having an optimised shape to fulfil their tasks and not being bulky in order to improve the storage volume of fuel or reducing agent into the tank.

Generally said thermoplastic components are produced by injection molding, blow molding, rotomolding, thermoforming or any other kind of molding and/or forming of a thermoplastic material known in industry.

The production cycle time with said manufacturing methods is very short, leading to a clear benefit for the industry. However, thermoplastic components must be designed according to specific rules in order to be compatible with such manufacturing methods.

Unfortunately, the complexity of the shape of the produced thermoplastic components produced by these methods is limited. The component may have an altered moldability due to its shape. Moreover, the wall thickness of a tank storing fuel or a reducing agent onto which a component is fixed, wall thickness transitions, draft angles, ribs, bosses are factors which influence the moldability of the component realised by molding and forming methods mentioned above. In particular, the wall thickness should be as uniform as possible. Therefore the variation of the thickness from a relatively thick cross-section to a thinner section should be gradual and not abrupt. Sharp internal corners in the part design should also be avoided. The internal corners should be rounded with a radius of 50-75% of the adjacent wall thickness. Non-uniform walls within the same part will experience differential cooling rates, which can lead to voids, sinks and warpage.

In order to overcome these shapes limitations and obtain a good moldability with the methods mentioned above, it would require a sequence of multiple molding and/or forming methods steps which would highly increase the manufacturing time of such components. Some thermoplastic components must be split into two or more subparts to be compatible with the molding method. These subparts need to be attached together by known methods such as welding, gluing, clipping, etc.

Another option would be to realise the piece integrally by three-dimensional printing (also called additive manufacturing) but the industrial method would be too long (the production cycle time is long). The printing of an object may take up to several hours (for a few grams) while injection molding requires solely few seconds. Moreover, post treatments are generally needed after printing (sandpaper polishing), for surface finish or to obtain a leak-tightness by addition of specific coatings.

In addition to the production cycle time and post-treatment problems mentioned above, the mechanical (brittleness and stiffness) properties of a plastic part obtained by successive deposition of layers by a three-dimensional printing apparatus are lower than the mechanical properties of the thermoplastic parts obtained by injection molding, blow molding, rotomolding, thermoforming and other common industrial method involving molding or forming of the thermoplastic. Therefore, a thermoplastic component fully obtained by deposition of a thermoplastic by a three-dimensional printing apparatus does not meet requirements for use in fuel systems and SCR systems. In other words, a manufacturing method based on a 3D printing only is not a useful solution.

Moreover, most of the thermoplastic materials compatible with three-dimensional printing are not compatible with fuel. For example, Acrylonitrile Butadiene Styrene is highly soluble in fuel.

It is desirable to have a manufacturing method able to provide thermoplastic component with complex shapes, meeting the mechanical and chemical properties of components dedicated to fuel systems and SCR systems, and that said thermoplastic component may be produced in a short amount of time.

There is thus a need to ensure the manufacturing of thermoplastic component having a complex geometry and which fulfil the requirements linked to the automotive industry, more particularly to their use in fuel systems and SCR systems. The object of the present invention is to provide a manufacturing method to provide thermoplastic component with complex geometry and to shorten the time required to obtain said plastic component. Another object of the present invention is to provide a thermoplastic component with complex geometry.

BRIEF DESCRIPTION OF THE ACCOMPANYING DRAWINGS

The FIGURE is a table that shows a non-exhaustive list of compatible materials.

SUMMARY

It is a first object of the invention to provide a thermoplastic component for fuel system or SCR system produced by a combination of industrial thermoplastic component for methods. Said thermoplastic component for fuel system or SCR system component is obtained by the combination of a first step consisting of plastic molding (injection molding, blow molding, rotomolding, etc.) and/or forming (thermoforming, vacuum forming, extrusion, etc.) and a second step of three-dimensional printing.

According to a preferred embodiment the method for manufacturing a thermoplastic component for fuel systems or SCR systems according to the invention comprises the following steps:
1. Molding and/or forming of a thermoplastic substrate from a first thermoplastic material,
2. Three-dimensional printing of a second thermoplastic material onto a first area of the thermoplastic substrate obtained after step wherein the first thermoplastic material of the thermoplastic substrate and the second thermoplastic material have a chemical compatibility.

The idea of the present invention is to provide a method to produce thermoplastic components dedicated to the fuel systems and/or SCR systems. Hereby fuel comprises gasoline, diesel and hydrogen. First, a thermoplastic substrate is obtained by a thermoplastic molding and/or forming industrial method. Later on, at least one thermoplastic material is applied onto the obtained substrate.

Said step of three-dimensional printing method is facilitating the production of thermoplastic components having complex geometry not realisable by common industrial plastic molding or forming method. Therefore it allows a wider range of possibilities of designs of said component to perform the task required by said thermoplastic component within a fuel system or a SCR system.

The method according to the invention avoids the realisation of the whole thermoplastic component by a three-dimensional printing is highly time consuming. Moreover several printing apparatus would be needed to manufacture a whole thermoplastic component, said several printing apparatus operating in parallel. This is not suitable for large production series in the automotive industry. This is the reason why the complex geometrics details of the thermoplastic component are solely performed by three-dimensional printing.

The term "complex geometrics" refers here to shape which are not obtainable by a single common thermoplastic molding or forming industrial method.

The term "thermoplastic material" refers here to any thermoplastic material or a blend of thermoplastics materials, said thermoplastic material being a plastic material, a polymer that becomes pliable or moldable above a specific temperature and solidifies upon cooling. It is understood that in case of a blend of thermoplastic materials, said blend of thermoplastic materials present in the thermoplastic substrate or the thermoplastic material applied by three-dimensional printing onto said substrate requires having a chemical compatibility with the thermoplastic of respectively the material to be printed or the material of the thermoplastic substrate.

The term "thermoplastic molding and/or forming industrial method" relates to plastic molding or forming methods used in industry such as injection molding, blow molding, rotomolding, extrusion, injection-blowing, calandering and thermoforming; excluding the three-dimensional printing.

The term "component" refers here to any kind of element which might be placed within or on the outer surface of a fuel system or a SCR system. Said component may be non-exclusively a roll-over valve, a venting valve, a fill limit venting valve, a nipple, a bracket, a filter, a heating support, an electrical connector, a part of a fuel or SCR tank shell, a fuel or SCR tank shell, a bracket and a clip.

The term "thermoplastic substrate" refers to a thermoplastic element obtained by an industrial thermoplastic forming or molding method.

The term "chemical compatibility" is here defined by two chemical species able to be welded together. In a particular embodiment, the welding of two thermoplastic elements is understood as two molten thermoplastic pressed together where an autohesion phenomenon occurs. Such autohesion is the phenomenon describing the intermolecular diffusion and chain entanglement across a thermoplastic polymer interface forming a strong bond. Unlike adhesion, which relies on surface energetics (or secondary chemical bonds between two materials either similar or dissimilar, autohesion relies on chain entanglements and secondary bonds for polymer chains of similar materials. Under ideal conditions, the diffusion is complete when the interface is no longer discernible from the bulk. Once thermoplastic polymer-to-thermoplastic polymer contact is achieved at the interface, intermolecular diffusion and entanglement is needed to complete the method and to form a good weld. A list non exhaustive of compatible material can be found in the FIGURE.

In a preferred embodiment, the second thermoplastic material is printed by a three-dimensional printing apparatus which is fed to a nozzle in a form of filament or pellets, and heated in the nozzle, once melted the thermoplastic material flows out the nozzle through an extrusion head. The term "three-dimensional printing" refers here to the deposition of plastic layer by layer. Said thermoplastic material is fed in forms of filaments (Fuse Deposition Modeling) or in form of pellets.

The Fuse Deposition Modeling (FDM) technology builds thermoplastic parts layer-by-layer by heating the second thermoplastic material until a semi-liquid state and extruding it according to computer-controlled paths, onto a thermoplastic substrate. The material is fed through the extrusion head in form of filament or pellets in a molten state.

It is considered that quasi-liquid or semi-liquid refers in physics to an element that lies along the boundary between a solid and a liquid The second thermoplastic material used for FDM is first prepared as a filament, by standard extrusion. The diameter of said filament is typically 1.75 mm or 3 mm. The filament is then wrapped to obtain a spool. Said three-dimensional printing machine is loaded with the thermoplastic spool which is later on fed through the extrusion head of the three-dimensional printing machine. The filament is transformed in molten state by "extrusion". The term extrusion refers here to the method of pushing the filament across a heated die. The filament melts due to contact with the heated die. The pushing is generally performed by rollers. The extrusion speed is relatively slow (below 150 mm/s) and accurately controlled. Moreover, after extrusion, the thermoplastic material cools down slowly, mostly by contact with ambient air, at room temperature or above.

Other systems, such as Freeformer machine from Arburg use directly plastic pellets. In this case, it is not necessary to prepare a filament of a second thermoplastic material. The thermoplastic pellets are melted in a plasticising unit (with a spiral screw in a heated barrel). Molten thermoplastic material is then applied layer by layer onto a thermoplastic substrate.

Alternatively, thermoplastic powder can be used. The three-dimensional printing method is then called SLS (Selective Laser Sintering). Layers of thermoplastic powder are applied onto a substrate, and then said thermoplastic powder is selectively melted by a laser.

In the case of the SLS, the extrusion head of the three-dimensional printing apparatus receives the thermoplastic material in a powder form.

For FDM, the extrusion head may be used to provide heat to the substrate onto which the layer obtained by FDM may be applied. Said heat provided to the substrate will facilitate the autohesion of the thermoplastic substrate and the at least one layer applied by three-dimensional printing apparatus onto it. Therefore an autohesion phenomenon occurs.

According to a preferred embodiment the method for manufacturing a thermoplastic component according to the invention comprises a step of three-dimensional printing of a third thermoplastic material onto a second area of the thermoplastic substrate obtained after step 1, wherein the first thermoplastic material of the thermoplastic substrate, the second thermoplastic material and the third thermoplastic material have a chemical compatibility. The first area and the second area of the thermoplastic substrate where the second and third thermoplastic materials are 3D printed are identical, partly different or different. By the expression "The first area and the second area of the thermoplastic substrate where the second and third thermoplastic material are 3D printed are identical, partly different or different", we intend to mean respectively that the third thermoplastic material is 3D printed on the second thermoplastic material, that the third thermoplastic material is 3D printed partly on the second thermoplastic material and partly on the first thermoplastic material, that the second and the third thermoplastic materials are 3D printed on different location of the thermoplastic substrate.

According to a preferred embodiment, the method for manufacturing a thermoplastic component according to the invention comprises a step of three-dimensional printing of a fourth thermoplastic material onto a third area of the thermoplastic substrate obtained after step 1, wherein the first thermoplastic material of the thermoplastic substrate, the second thermoplastic material, the third thermoplastic material and the fourth thermoplastic material have a chemical compatibility.

According to a preferred embodiment of the previous one, the method for manufacturing a thermoplastic component according to the invention is such that the three dimensional printing of the second thermoplastic material onto the thermoplastic substrate comprises the steps of Feeding the second thermoplastic material to a nozzle in a form of filament or pellets, Heating the second thermoplastic material in the nozzle, Melting the second thermoplastic material in the nozzle and Flowing the second thermoplastic material out the nozzle through an extrusion head.

According to a preferred embodiment the method for manufacturing a thermoplastic component according to the invention is such that the three dimensional printing of the third thermoplastic material onto the thermoplastic substrate comprises the steps of Feeding the third thermoplastic material to a nozzle in a form of filament or pellets, Heating the third thermoplastic material in the nozzle, Melting the third thermoplastic material in the nozzle, Flowing the third thermoplastic material out the nozzle through an extrusion head.

According to the method for manufacturing a thermoplastic component according to the invention is such that the thermoplastic substrate is moving in at least a plurality of plans non parallel to the movement plan of the extrusion head.

In a particular embodiment, the claimed method might be used to join two elements made of material chemically not compatible. Such method may be used to connect a nipple made of polyphtalamide (PPA) and a fuel tank shell made of high density polyethylene (HDPE). The PPA and the HDPE are not chemically compatible. A solution to join these two pieces is to use a three-dimensional printing apparatus to apply a second thermoplastic material acting as a compatibilizer onto the fuel tank shell. It is hereby understood that the term "compabitilizer" refers to a polymer having chemical bonds with 2 other polymers being not miscible. Said thermoplastic material is chemically compatible with the fuel tank shell made of HDPE. Said 3D printed second thermoplastic material is also chemically compatible with the PPA. Therefore an autohesion phenomenon occurs between the 3D printed layer and the fuel tank shell materials but also between the at least one 3D printed layer and the nipple materials. The 3D printed second thermoplastic material may in this example be polyethylene-grafted maleic anhydride (PE-G-Ma). There are example of PE-G-Ma such as Admer GT 65 from Mitsui or Orevac and Lotader from Arkema In another particular embodiment, 3D printing step of the method according to the invention can be used to manufacture a low emission component or part of component with fuel barrier layer on a thermoplastic substrate. A continuity of fuel barrier layer is provided between the component and the thermoplastic substrate.

To ensure low evaporative emissions, plastic fuel tanks are made of several plastic layers. Typically, EVOH (copolymer ethylene vinyl alcohol) or PA6 (polyamide 6) are used as barrier layer to prevent hydrocarbons from diffusing across the wall of the tank. An HDPE layer alone does not provide a good barrier against diffusion of fuel. HDPE layers ensure the mechanical resistance of the tank shell. Adhesive layers are placed between HDPE layers and EVOH layer.

Components such as venting nipple are welded on the surface of the fuel tank for venting fuel vapors. In order to reduce evaporative emissions, such nipple can be made of 2K materials (PA+PE for example) so that the nipple can be welded on the HDPE tank shell while reducing hydrocarbon diffusion. However, hydrocarbons can still migrate through the HDPE layer of the tank shell and at the interface between the nipple and the tank shell. There is thus a need for a continuity of barrier layer between tank shell and component.

By 3D printing, a barrier material can be printed directly onto the barrier layer of the tank shell. For example, HDPE is difficult to print. To limit this disadvantage, a transition from HDPE to PA6 is possible. PA6 is easy to print. HDPE and PA6 can be printed alternatively so that a mechanical fixation is obtained.

According to a preferred embodiment, the method for manufacturing a thermoplastic component according the invention is such that the first and/or the second and-or the third and/or the fourth thermoplastic material are based on polyoxymethylene.

According to a preferred embodiment, the method for manufacturing a thermoplastic component according to the invention is such that the three-dimensional printing of the second thermoplastic material is performed on the thermoplastic substrate being at a temperature of at most 10° C. below the melting temperature of the first thermoplastic material.

According to a preferred embodiment, the method for manufacturing a thermoplastic component according the invention is such that the second thermoplastic material is three-dimensional printed in a volume being cubic with and having an edge equal to or less than 50 mm.

According to a preferred embodiment the method for manufacturing a thermoplastic component according to the invention is such that the second thermoplastic material comprises reinforcing fibres.

According to the method for manufacturing a thermoplastic component according to the invention is such that the three-dimensional printing is used to add customised references.

In another particular embodiment, the method might be used to customize the contact surface between a fastening means of a component and a surface of the tank shell to facilitate the contact of the fastening means and the surface of the fuel tank shell. The method claimed enables the production of a standardized fastening means and its adaptation to a tank shell regardless of the surface contact provided by said tank shell. The three-dimensional printed materials are applied onto the contact surface of the tank shell meant to receive the fastening means, thus the attachment of the fastening means to the fuel tank shell by mechanical means or welding is obtained.

In another embodiment, plastic brackets are used to fix the tank shell onto the vehicle. These brackets must be designed according to the surface of the fuel or SCR tank shell. The shape of the bracket must have a specific profile to fit with the surface of the tank. Specific radius must be applied. Nowadays, these brackets are generally injection molded while the fuel or SCR tank is blow molded. A specific injection mold is needed for each version of tank. According to the invention, a standard plastic bracket may be designed to be common to all the fuel and SCR tank versions. Thus, only one injection mold would be needed. The standard plastic bracket is then customised by three-dimensional printing apparatus to be adapted to the shape of the tank shell.

In a preferred embodiment, the addition of thermoplastic material by three-dimensional printing is realised once the temperature of the thermoplastic substrate is at least about 10° C. below of the melting temperature of said material.

The 3D printing of at least one thermoplastic material may be performed by a three-dimensional printing apparatus onto the manufactured thermoplastic substrate without requiring it to have completely cool down.

In particular, the thermoplastic substrate obtained by a conventional molding or forming method is still warm when it comes from the injection molding machine or the extruder The 3D printing of at least one thermoplastic material by a three-dimensional printing apparatus can be advantageously performed before the thermoplastic substrate has cool down. The adhesion between the 3D printed thermoplastic material and the thermoplastic substrate is improved thanks to the higher temperature of the thermoplastic substrate. The higher the temperature of the thermoplastic substrate is, in the limit of the quasi-solid state, the better the polymer chain will be.

It is even preferred that the three-dimensional printing is realised without waiting that the manufactured thermoplastic substrate has completely cooled down. Therefore the production method is shortened. Moreover the application of thermoplastic materials by three-dimensional printing onto a warm thermoplastic substrate having facilitates the adhesion of the both thermoplastic used in the both methods. It improves the autohesion phenomenon.

In a particular embodiment, the three-dimensional printing step is used to add customised references. The use of three-dimensional printing allows a traceability of the manufactured components. By three-dimensional printing, it is possible to leave a mark on the component such as the production date, the batch number, the part number, the operating range relative to the Si unit (International System unit), or any other relevant information for said component. Such information provides a unique reference for each component.

In a particular embodiment, the thermoplastic material to be printed onto the thermoplastic substrate comprises reinforcing fibres. It is advantageous to be able to feed thermoplastic material and reinforcing fibres, through the same nozzle of a three-dimensional printing apparatus. Said thermoplastic material and reinforcing fibres are fed through the same nozzle inlet. Said thermoplastic material and reinforcing fibres are provided in a form of continuous reinforcing fibres impregnated with thermoplastic material. Internal reinforcement structure is provided in the document WO2015/059249. These reinforcements might be improved by applying impregnated reinforcing fibres in a particular orientation, thanks to three-dimensional printing.

In an advantageous particular embodiment, pillars present within a fuel system may be reinforced by 3D printing reinforcing fibres onto at least one portion of said pillars.

Polyoxymethylene (POM) is a semi-crystalline thermoplastic material known for its excellent fuel resistance. However, the shrinkage of this thermoplastic material makes it very difficult to use for three-dimensional printing. It is known that parts printed in POM exhibit very high deformation. Internal stress in the printed part is very high causing delamination between the layers applied by a three-dimensional printing apparatus. It has been observed that surprisingly for parts with dimensions lower than a critical value the deformation due to shrinkage is highly limited. The term "critical value" refers hereby to a volume being a cube where the edge is 50 mm long.

Experiments have been performed using a thermoplastic material being polyoxymethylene (POM; $(CH_2O)n$).

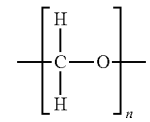

The by 3D printing of vertical sheets made of POM has been performed on an injection molded plate of POM thanks to a three-dimensional printing apparatus. Two types of plates (vertical rectangles) have been printed. The first set is considered as plates of the set A having a length of 50 mm, a height of 100 mm and a width of 3 mm. The second set is considered as plates of the set B having a length of 80 mm, a height of 100 mm and a width of 3 mm. After comparing the results relative to mechanical resistance and more particularly to tensile stress of the plates of the set A and set B, it has been noticed that the size of the printed element influences its mechanical characteristics. The testing procedure is the following:

Tensile test specimens have been machined in the plate, along the vertical direction. In this way, the tensile stress is applied perpendicularly to the printed layers.
The tensile speed is 50 mm/min.
The temperature for tensile test is 23° C.
The samples are conditioned at 23° C. and 50% relative humidity during 7 days before testing.
Tensile test is performed according to ISO 527.
Tensile specimens are ISO 527-1/BA.

The average tensile stress at yield for the plates of the set A is about 33.7 MPa and for the plates of the set B, the tensile stress is about 22 MPa. The minimal tensile stress for the plates of the set B is of 14.2 MPa and 31.9 MPa for the plates of the set A. It may also be observed that the standard deviation is higher for the plates of the set B. Table II shows the results obtained.

TABLE II

|       | Average tensile stress at yield (MPa) | Minimal value for the tensile stress at yield (MPa) |
|-------|---------------------------------------|-----------------------------------------------------|
| Set A | 33.7                                  | 31.9                                                |
| Set B | 22                                    | 14.2                                                |

Consequently, it is assumed that parts having dimensions equal or lower to a cube having an edge of 50 mm can be printed in POM.

Adhesion between thermoplastic substrate and 3D printed POM layer was also studied. 3D printing POM material on a POM support was preferential for the experiment. Said conditions were preferential due to the chemical compatibility between the thermoplastic substrate and the 3D printed material applied thereon. For parts with dimensions exceeding a cube having an edge of 50 mm, it has been noticed the three-dimensional printing is impossible due to the delamination between the 3D printed layers of POM, or between the injection molded plate and the first printed layer.

Defaults appear during the crystallization phases. Crystallization can be influenced either by applying thermoplastic layers thanks to three-dimensional printing apparatus into a high or low temperature chamber It has been noticed by experiments that the enclosure temperature maintained at 10 degrees Celsius, would allow the 3D printing of thermoplastic material with dimension exceeding a cube having an edge of 50 mm. This is due to the fact that the crystallisation of the POM at this temperature is very low. The time for crystallization exceeds the time for applying at least one layer thanks to the three-dimensional printing apparatus.

Crystallinity of POM and polymer blends containing POM has been studied by Differential Scanning calorimetry (DSC). Crystallinity is defined as the ratio of the enthalpy of fusion of the sample over the theoretical enthalpy of fusion of a fully crystalline POM (326 j/g). The theoretical enthalpy of fusion of a fully crystalline POM is known from literature see table III.

TABLE III

Polymer Heats of Fusion

| Acronym (4) | Name | Enthalpy (kJ/mol) (3) | Repeat Unit | Molecular Weight (g/mol) | Enthalpy (J/g) |
|---|---|---|---|---|---|
| PE | Polyethylene | 4.11 | —$CH_2$— | 14.03 | 293 |
| PP | Polypropylene | 8.70 | —$CH_3CH(CH_3)$— | 42.08 | 207 |
| PB | Polybutene-1 | 7.00 | —$CH_2CH(C_2H_5)$ | 56.1 | 125 |
| POM | Polymethylenoxide | 9.79 | —$CH_3O$— | 30.03 | 326 |
| PEOX | Polyethyleneoxide | 8.66 | —$CH_3CH_2O$— | 44.05 | 197 |
| PA6 | Polycaprolactam | 26.0 | —$NH(CH_2)_5CO$— | 113.2 | 230 |
| PA11 | Polyundecanolactam | 44.7 | —$NH(CH_2)_{10}CO$— | 183.3 | 244 |
| PA12 | Polylauryllactam | 48.4 | —$NH(CH_2)_{11}CO$— | 197.3 | 245 |
| PA66 | Poly(hexamethylene adipamide) | 57.8 | —$NH(CH_2)_6NHCO(CH_2)_4CO$— | 256.3 | 226 |
| PA69 | Poly(hexamethylene nonanediamide) | 69 | —$NH(CH_2)_6NHCO(CH_2)_7CO$— | 268.4 | 257 |
| PA610 | Poly(hexamethylene sebacamide) | 71.7 | —$NH(CH_2)_6NHCO(CH_2)_8CO$— | 282.4 | 254 |
| PA612 | Poly(hexamethylene dodecanediamide) | 80.1 | —$NH(CH_2)_6NHCO(CH_2)_{10}CO$— | 310.5 | 258 |
| PVOH | Polyvinyl alcohol | 7.11 | —$CH_2CH(OH)$— | 44.05 | 161 |
| PET | Polyethylene terephathalate | 26.9 | —$O(CH_2)_2O_2CC_6H_4CO$— | 192.2 | 140 |
| PBT | Polybutylene terephathalate | 32.0 | —$O(CH_2)_4O_2CC_6H_4CO$— | 220.2 | 145 |
| PVF | Polyvinyl fluoride | 7.54 | —$CH_2CH(F)$— | 46.04 | 164 |
| PVDF | Polyvinylidene fluoride | 6.70 | —$CH_2CF_2$— | 64.03 | 105 |
|  | Polytrifluoroethylene | 5.44 | —$CH(F)CF_2$— | 82.0 | 66.3 |
| PTFE | Polytetrafluoroethylene | 4.10 | —$CF_2$— | 50.0 | 82.0 |
| PVC | Polyvinyl chloride | 11.0 | —$CH_2CH(Cl)$— | 62.50 | 176 |
| PCTFE | Polychlorotrifluoroethylene | 5.02 | —$CF_2CF(Cl)$— | 116.5 | 43.1 |
| PEEK | Polyetheretherketone | 37.4 | —$C_6H_4COC_6H_4OC_6H_4O$— | 288.3 | 130 |

All DSC measurements have been performed under nitrogen, from −68° C. to 200° C. The heating speed was 10° C./min. The quantity of sample is about 10 mg.

The enthalpy of fusion (also called heat of fusion) has been measured twice for a POM 3D printing filament. The result is 148.6 J/g and 148.0 J/g. This means 46% of crystallinity.

It is possible to delay said crystallization by providing an ambient temperature in the printing chamber of the three-dimensional printing apparatus close to the crystallization of the polymer used (here it refers to POM).

Thermal behaviour of POM has been observed by DSC. An isothermal DSC of POM has been measured. The sample of POM has been heated up to 215 degrees Celsius. A fusion peak is observed at 170.6 degrees Celsius. Said POM sample is cooled down to 155 degrees Celsius. Then the temperature is set at 155 degrees Celsius for a period of one hour. Crystallization occurred during the first 30 minutes. At the end of the experiment the sample is cooled down to −50 degrees Celsius with a second crystallization peak that appears as soon as the temperature is below 155 degrees Celsius. The isothermal stage has been set at 155 degrees Celsius. This analysis simulates the behaviour of the material after extrusion by heating head (at 220 degrees Celsius) with a 3D printing chamber at 155 degrees Celsius.

By setting the 3D printing chamber temperature to 155 degrees Celsius, the crystallization has been delayed over minutes. The delay of the crystallization leaves the three-dimensional printing apparatus time to print more layers before the crystallization occurs. The layers do not crystallize immediately after flowing out of the extrusion head. Therefore a larger amount of polymer may be applied onto the thermoplastic substrate or onto already printed layer(s) before crystallisation. The deformation of the printed component due to crystallization is then limited. The second interesting phenomenon relates to the later part of the experiment and the second crystallization phase which occurs below 155 degree Celsius. When the 3D printing chamber is set at 155 degrees Celsius, only a part of the crystallization occurs during printing. Said 3D printed thermoplastic material is submitted to lower stress due to shrinkage. Said second crystallization may be avoided by quenching. Said quenching (being a rapid cooling step), once performed at the end of the printing phase, avoid the second crystallization of the 3D printed thermoplastic material. Said quenching may be obtained by quickly transferring the printed part into a second chamber with a lower temperature. It is known that when a crystalline polymer is cooled thanks to quenching, the kinetic of chains rearrangement is blocked, which reduces the final crystallinity. Other parameters than the temperature may be used to improve said contact between the at least one printed layer and the substrate.

In a particular embodiment, the thermoplastic used for the three-dimensional printing is a thermoplastic comprising at least one chemical additive. It may be advantageous to introduce an additive in order to improve the compatibility of the thermoplastic used for the thermoplastic substrate and the at least one 3D printed thermoplastic material. In particular, the additive can be blended with the thermoplastic material during extrusion of the filament or preparation of the pellets or powder.

It has been noticed by experiments that the use of additives such as PLA (polylactic acid; $(C_3H_4O_2)_n$) blended with POM allows for reducing the crystallinity of the blend.

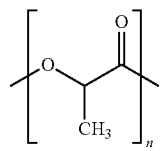

The POM and the PLA form a blend, which enables the printing of thermoplastic parts with dimension exceeding a cube having an edge of 50 mm. The blends POM/PLA are prepared with a twin screw co-rotating extruder to obtain filaments (with diameter close to 1.75 mm). The temperature settings for the extruder barrel were the following (from hopper to die, in degree Celsius): 80-160-190-710-720-720-220-215-180-170-170-170. The screw rotation speed was 90 RPM. The addition of PLA to the POM reduces the crystallinity of the blend compared to the crystallinity of the POM alone. PLA is chosen as an additive to the POM, as the both polymers are able to form H-bonds with a third polymer being a compatibilizer. The viscosity of the PLA is ideal for three-dimensional printing and the adhesion to the heat tray is satisfying. Furthermore, the PLA (grade Ingeo 4060D from Natureworks LLC) used during experiments is an amorphous polymer and may thus reduce the POM crystallinity. The theoretical enthalpy of fusion for a fully crystalline POM is 326 J/g.

The enthalpy of fusion has been measured twice for a POM/PLA blend with 20 weight % PLA. The result is 136.9 J/g and 142.8 J/g. This means respectively 42% and 44% of crystallinity for the blend.

The enthalpy of fusion has been measured twice for a POM/PLA blend with 40 weight % PLA. The result is 108.6 J/g and 94.5 J/g. This means respectively 33% and 29% of crystallinity for the blend.

The differences observed between the 2 results for each blend is probably due to inhomogeneity of the blend. The PLA and the POM are not miscible.

The distribution of EVOH (Ethylene Vinyl alcohol) is quite homogeneous in POM.

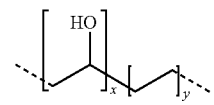

As the chemical structure of PLA is close to the chemical structure of the POM, the same observations may be expected for a PLA/EVOH blend. Thus the idea to use EVOH is relevant. The sample realised are filaments, to be extruded by the there-dimensional printing apparatus, are made of POM/PLA blends where the proportions of the PLA in the blend are 10 weight %, 20 weight %, 30 weight % and 40 weight %.

Blend of POM and EVOH have also been studied. The sample realised are filaments, to be extruded by the there-dimensional printing apparatus.

The enthalpy of fusion has been measured twice for a POM/EVOH blend with 10 weight % EVOH. The result is 138.3 J/g and 138.2 J/g. This means respectively 42% of crystallinity for the blend.

The enthalpy of fusion has been measured twice for a POM/EVOH blend with 30 weight % EVOH. The result is 115.1 J/g and 115.1 J/g. This means respectively of crystallinity for the blend.

As a result of the experiments the POM/PLA bend with 40% of PLA is less crystalline than pure POM. Same observation may be made for all the blends used as sample relative to a pure POM sample.

EVOH may also be used as a compatibilizer between POM and PLA. This enhances the blend homogeneity. It is understood by "enhancing the blend homogeneity" as crating bonds with the POM and the PLA being not miscible.

The EVOH establishes H-bonds with POM and PLA, and improves the chemical compatibility between POM and PLA and reduces demixing. The scheme below illustrates the interactions (Hydrogen bonds) between EVOH and POM and between EVOH and PLA.

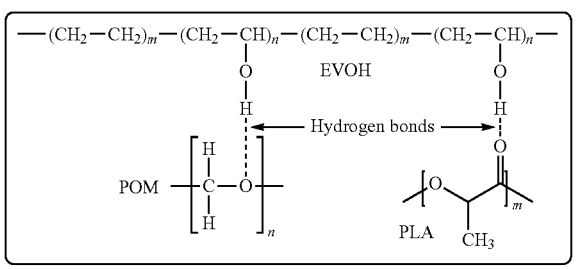

Over-printing with the above mentioned blends has been tested. The POM injection molded plate has been used as substrate on which a 3D printing is performed. It means that the molten material coming from the extruder nozzle was directly 3D printed onto the POM injection molded plate. Therefore, the POM injection molded plate has been fixed on the printing tray of the 3D printing apparatus.

The printed objects are plates with dimensions 50 mm (length), 30 mm (height) and 3 mm (thickness). These plates are printed vertically.

The distance between printing nozzle and the POM injection molded plate is 0.2 mm.

Vertical plates consisting in one case of pure POM and in the other case of POM, 30 weight % PLA and 1 weight % EVOH, have been printed onto an injection molded plate in pure POM. The blend is applied onto the POM plate, and the vertical plates respect the dimensions and geometry of the computing model. The detachment distance between the POM injection molded plate and the 3D printed vertical plates has been measured.

Pure POM: detachment distance of 8 mm

Blend POM with 20 weight % of PLA: detachment distance of 5 mm

Blend POM with 40 weight % of PLA: detachment distance of 1 mm

The decreasing of crystallinity observed through DSC is effective resulting in a reduced shrinkage. The adhesion between the injection molded plate and the 3D printed thermoplastic material is reduced.

Further experiments concerning tensile stress at yield, in accordance with the norm ISO 527-1, have been performed. It has been observed over a batch of 5 test pieces that the average tensile stress at yield is equal to 15.8 MPa and some tensile stress at yield may reach values up to 24 MPa.

A strong adhesion between the POM injection molded substrate and the 3D printed thermoplastic material is observed. Therefore, the components obtainable by the method as according to the invention are suitable for use in said fuel systems and SCR systems, as long as the at least one applied layer remains in a cube having an edge of 50 mm.

The invention claimed is:

1. A method for manufacturing a component having a complex shape for fuel systems or SCR systems comprising:
   1. Molding and/or forming of a thermoplastic substrate comprising a first thermoplastic material,
   2. Three-dimensional printing of a second thermoplastic material onto a first area of the thermoplastic substrate obtained after step 1, wherein the first thermoplastic material of the thermoplastic substrate and the second thermoplastic material have a chemical compatibility, and wherein the second thermoplastic material is three-dimensionally printed wherein all three dimensions are equal to or less than 50 mm.

2. The method according to claim 1, further comprising:
   3'. Three-dimensional printing of a third thermoplastic material onto the second thermoplastic material obtained after step 2, wherein the first thermoplastic material of the thermoplastic substrate and the third thermoplastic material have no chemical compatibility, and wherein the second thermoplastic material is compatible with both the first thermoplastic material and the third thermoplastic material and acts as a compatibilizer between the first thermoplastic material of the thermoplastic substrate and the third thermoplastic material.

3. The method according to claim 1, wherein the first and/or the second thermoplastic material are based on polyoxymethylene.

4. The method according to claim 1, wherein the three-dimensional printing of the second thermoplastic material is performed on the thermoplastic substrate being at a temperature of at most 10° C. below the melting temperature of the first thermoplastic material.

5. The method according to claim 1, wherein the second thermoplastic material comprises reinforcing fibers.

6. The method according to claim 1, wherein said component further comprises a barrier layer upon which a barrier material is directly printed.

7. The method according to claim 1, wherein the step 2 comprises three dimensional printing of the second thermoplastic material onto the thermoplastic substrate by:
   2.1. Feeding the second thermoplastic material to a nozzle in a form of filament or pellets,
   2.2. Heating the second thermoplastic material in the nozzle,
   2.3. Melting the second thermoplastic material in the nozzle,
   2.4. Flowing the second thermoplastic material out the nozzle through an extrusion head.

8. The method according to claim 7, wherein the method further comprises three dimensional printing of the third thermoplastic material onto the thermoplastic substrate by:
   3.1. Feeding the third thermoplastic material to a nozzle in a form of filament or pellets,
   3.2. Heating the third thermoplastic material in the nozzle,
   3.3. Melting the third thermoplastic material in the nozzle,
   3.4. Flowing the third thermoplastic material out the nozzle through an extrusion head.

9. The method according to claim 1, further comprising:
   3. Three-dimensional printing of a third thermoplastic material onto a second area of the thermoplastic substrate obtained after step 1, wherein the first thermoplastic material of the thermoplastic substrate, the second thermoplastic material and the third thermoplastic material have a chemical compatibility.

10. The method according to claim 9, wherein the step 3 comprises three dimensional printing of the third thermoplastic material onto the thermoplastic substrate by:
- 3.1. Feeding the third thermoplastic material to a nozzle in a form of filament or pellets,
- 3.2. Heating the third thermoplastic material in the nozzle,
- 3.3. Melting the third thermoplastic material in the nozzle,
- 3.4. Flowing the third thermoplastic material out the nozzle through an extrusion head.

11. The method according to claim 9, wherein the thermoplastic substrate is moving in at least a plurality of planes non parallel to a movement plane of an extrusion head.

12. The method according to claim 9, wherein the first and/or the second and/or the third thermoplastic material are based on polyoxymethylene.

13. The method according to claim 9, wherein the third thermoplastic material is three-dimensionally printed on the second thermoplastic material, or the third thermoplastic material is three-dimensionally printed partly on the second thermoplastic material and partly on the first thermoplastic material, or the second and third thermoplastic materials are three-dimensionally printed on different locations of the thermoplastic substrate.

14. The method according to claim 13, wherein the step 3 comprises three dimensional printing of the third thermoplastic material onto the thermoplastic substrate by:
- 3.1. Feeding the third thermoplastic material to a nozzle in a form of filament or pellets,
- 3.2. Heating the third thermoplastic material in the nozzle,
- 3.3. Melting the third thermoplastic material in the nozzle,
- 3.4. Flowing the third thermoplastic material out the nozzle through an extrusion head.

15. The method according to claim 13, further comprising the step of:
- 3". Three-dimensional printing of a fourth thermoplastic material onto a third area of the thermoplastic substrate obtained after step 1, wherein the first thermoplastic material of the thermoplastic substrate, the second thermoplastic material, the third thermoplastic material and the fourth thermoplastic material have a chemical compatibility.

16. The method according to claim 14, further comprising:
- 3. a Three-dimensional printing of a fourth thermoplastic material onto a third area of the thermoplastic substrate obtained after step 1, wherein the first thermoplastic material of the thermoplastic substrate, the second thermoplastic material, the third thermoplastic material and the fourth thermoplastic material have a chemical compatibility.

17. The method according to claim 16, wherein the step 3.a comprises three dimensional printing of the third thermoplastic material onto the thermoplastic substrate by:
- 3.1. Feeding the third thermoplastic material to a nozzle in a form of filament or pellets,
- 3.2. Heating the third thermoplastic material in the nozzle,
- 3.3. Melting the third thermoplastic material in the nozzle,
- 3.4. Flowing the third thermoplastic material out the nozzle through an extrusion head.

18. The method according to claim 16, wherein the first and/or the second and/or the third and/or the fourth thermoplastic material are based on polyoxymethylene.

19. A component obtainable by the method according to claim 1.

20. The component according to claim 19, wherein the component obtained by the method is a low emission component or a part of a component with fuel barrier layer on the thermoplastic substrate, wherein in said part of a component with fuel barrier layer continuity of the fuel barrier layer is provided between the component and the thermoplastic substrate.

* * * * *